(12) United States Patent
Early et al.

(10) Patent No.: US 12,175,527 B2
(45) Date of Patent: Dec. 24, 2024

(54) SYSTEM AND METHOD FOR LARGE SCALE DATA EXTRACTION AND PROCESSING

(71) Applicant: BANK OF AMERICA CORPORATION, Charlotte, NC (US)

(72) Inventors: Stephen I. Early, Avondale, PA (US); Robert J. Bauer, Middletown, DE (US); Meng Gu, Marietta, GA (US); Harmeet Khanna Kalra, Dublin, CA (US); Swapna Kandra, Hyderabad (IN); Hyun Mo Koo, Suwanee, GA (US); Venkatrao Meenavalli, Hyderabad (IN); Kiran Kumar Mothi, Hyderabad (IN); Bryan James Smith, Knoxville, TN (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 86 days.

(21) Appl. No.: 18/132,692

(22) Filed: Apr. 10, 2023

(65) Prior Publication Data

US 2024/0338759 A1   Oct. 10, 2024

(51) Int. Cl.
   *G06Q 40/02*     (2023.01)
(52) U.S. Cl.
   CPC .................. *G06Q 40/02* (2013.01)

(58) Field of Classification Search
   CPC .................................................. G06Q 40/02
   See application file for complete search history.

(56) References Cited

U.S. PATENT DOCUMENTS

| | | | |
|---|---|---|---|
| 7,099,878 B2 * | 8/2006 | Bruce | G06Q 20/04 |
| 7,383,212 B1 * | 6/2008 | Cleveland | G06Q 10/02 705/26.1 |
| 7,653,587 B2 * | 1/2010 | King | G06Q 40/128 705/64 |
| 2009/0138386 A1 * | 5/2009 | Wilson, Jr. | G06Q 30/0273 705/14.69 |

* cited by examiner

*Primary Examiner* — Benjamin M Thieu
(74) *Attorney, Agent, or Firm* — Moore & Van Allen PLLC; Nicholas C. Russell

(57) ABSTRACT

Systems, computer program products, and methods are described herein for large scale data extraction and processing. The method includes receiving a transmission request. The transmission request indicates two or more accounts for which one or more account statements are to be retrieved. The method also includes selecting a first retrieval set of the two or more accounts. A first retrieval set size of the first retrieval set is based on a first expected network capacity. The method further includes causing a retrieval of one or more account statements associated with first retrieval set. The method still further includes selecting a second retrieval set of the two or more accounts. A second retrieval set size of the second retrieval set is based on a second expected network capacity. The method includes causing a retrieval of one or more account statements associated with the second retrieval set.

20 Claims, 4 Drawing Sheets

SYSTEM AND METHOD FOR LARGE SCALE DATA EXTRACTION AND PROCESSING

TECHNOLOGICAL FIELD

Example embodiments of the present disclosure relate generally to data extraction and, more particularly, to large scale data extraction and processing.

BACKGROUND

Mass data can be stored in databases with little to no functional operability. While data often has identifiers, it is often difficult to locate and retrieve specific data on a large scale. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for large scale data extraction and processing is provided. The system includes at least one non-transitory storage device and at least one processing device coupled to the at least one non-transitory storage device. The at least one processing device is configured to receive a transmission request. The transmission request indicates two or more accounts for which one or more account statements are to be retrieved. The at least one processing device is also configured to select a first retrieval set of the two or more accounts. A first retrieval set size of the first retrieval set is based on a first expected network capacity during at least a portion of a first retrieval time period. The first retrieval set includes at least one of the two or more accounts. The at least one processing device is further configured to cause a retrieval of one or more account statements associated with each of the at least one of the two or more accounts in the first retrieval set during the first retrieval time period. The at least one processing device is still further configured to select a second retrieval set of the two or more accounts. A second retrieval set size of the second retrieval set is based on a second expected network capacity during at least a portion of a second retrieval time period. The second retrieval set includes at least one of the two or more accounts. The at least one processing device is also configured to cause a retrieval of one or more account statements associated with each of the at least one of the two or more accounts in the second retrieval set during the second retrieval time period.

In various embodiments, the at least one processing device is also configured to cause a retrieval of the first retrieval set to be paused based on a difference between the first expected network capacity and an actual network capacity during the first retrieval set. In various embodiments, the at least one processing device is also configured to determine the first expected network capacity based on an average network bandwidth during a same time period on one or more different days.

In various embodiments, the first retrieval time period is during a same time period on a first day and the second retrieval time period is during the same time period on a second day. In various embodiments, the at least one processing device is configured to determine at least one of the first retrieval time period or the second retrieval time period based on a pattern of network capacity.

In various embodiments, the one or more account statements associated with each of the at least one of the two or more accounts in the first retrieval set includes one or more account statements during a statement time frame and the transmission request indicates the statement time frame. In various embodiments, the one or more account statements associated with each of the at least one of the two or more accounts in the second retrieval set includes one or more account statements during the statement time frame.

In another example embodiment, a computer program product for large scale data extraction and processing is provided. The computer program product includes at least one non-transitory computer-readable medium having computer-readable program code portions embodied therein. The computer-readable program code portions include an executable portion configured to receive a transmission request. The transmission request indicates two or more accounts for which one or more account statements are to be retrieved. The computer-readable program code portions also include an executable portion configured to select a first retrieval set of the two or more accounts. A first retrieval set size of the first retrieval set is based on a first expected network capacity during at least a portion of a first retrieval time period. The first retrieval set includes at least one of the two or more accounts. The computer-readable program code portions further include an executable portion configured to cause a retrieval of one or more account statements associated with each of the at least one of the two or more accounts in the first retrieval set during the first retrieval time period. The computer-readable program code portions still further include an executable portion configured to select a second retrieval set of the two or more accounts. A second retrieval set size of the second retrieval set is based on a second expected network capacity during at least a portion of a second retrieval time period. The second retrieval set includes at least one of the two or more accounts. The computer-readable program code portions also include an executable portion configured to cause a retrieval of one or more account statements associated with each of the at least one of the two or more accounts in the second retrieval set during the second retrieval time period.

In various embodiments, the computer program product further includes an executable portion configured to cause a retrieval of the first retrieval set to be paused based on a difference between the first expected network capacity and an actual network capacity during the first retrieval set. In various embodiments, the computer program product further includes an executable portion configured to determine the first expected network capacity based on an average network bandwidth during a same time period on one or more different days.

In various embodiments, the first retrieval time period is during a same time period on a first day and the second retrieval time period is during the same time period on a second day. In various embodiments, the computer program product further includes an executable portion configured to determining at least one of the first retrieval time period or the second retrieval time period based on a pattern of network capacity.

In various embodiments, the one or more account statements associated with each of the at least one of the two or more accounts in the first retrieval set comprises one or more account statements during a statement time frame and the transmission request indicates the statement time frame.

In various embodiments, the one or more account statements associated with each of the at least one of the two or more accounts in the second retrieval set includes one or more account statements during the statement time frame.

In still another example embodiment, a computer-implemented method for large scale data extraction and processing is provided. The method includes receiving a transmission request. The transmission request indicates two or more accounts for which one or more account statements are to be retrieved. The method also includes selecting a first retrieval set of the two or more accounts, wherein a first retrieval set size of the first retrieval set is based on a first expected network capacity during at least a portion of a first retrieval time period. The first retrieval set includes at least one of the two or more accounts. The method further includes causing a retrieval of one or more account statements associated with each of the at least one of the two or more accounts in the first retrieval set during the first retrieval time period. The method still further includes selecting a second retrieval set of the two or more accounts. A second retrieval set size of the second retrieval set is based on a second expected network capacity during at least a portion of a second retrieval time period. The second retrieval set includes at least one of the two or more accounts. The method also includes causing a retrieval of one or more account statements associated with each of the at least one of the two or more accounts in the second retrieval set during the second retrieval time period.

In various embodiments, the method also includes causing a retrieval of the first retrieval set to be paused based on a difference between the first expected network capacity and an actual network capacity during the first retrieval set. In various embodiments, the method also includes determining the first expected network capacity based on an average network bandwidth during a same time period on one or more different days.

In various embodiments, the first retrieval time period is during a same time period on a first day and the second retrieval time period is during the same time period on a second day. In various embodiments, the one or more account statements associated with each of the at least one of the two or more accounts in the first retrieval set comprises one or more account statements during a statement time frame and the transmission request indicates the statement time frame. In various embodiments, the one or more account statements associated with each of the at least one of the two or more accounts in the second retrieval set comprises one or more account statements during the statement time frame.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1A:
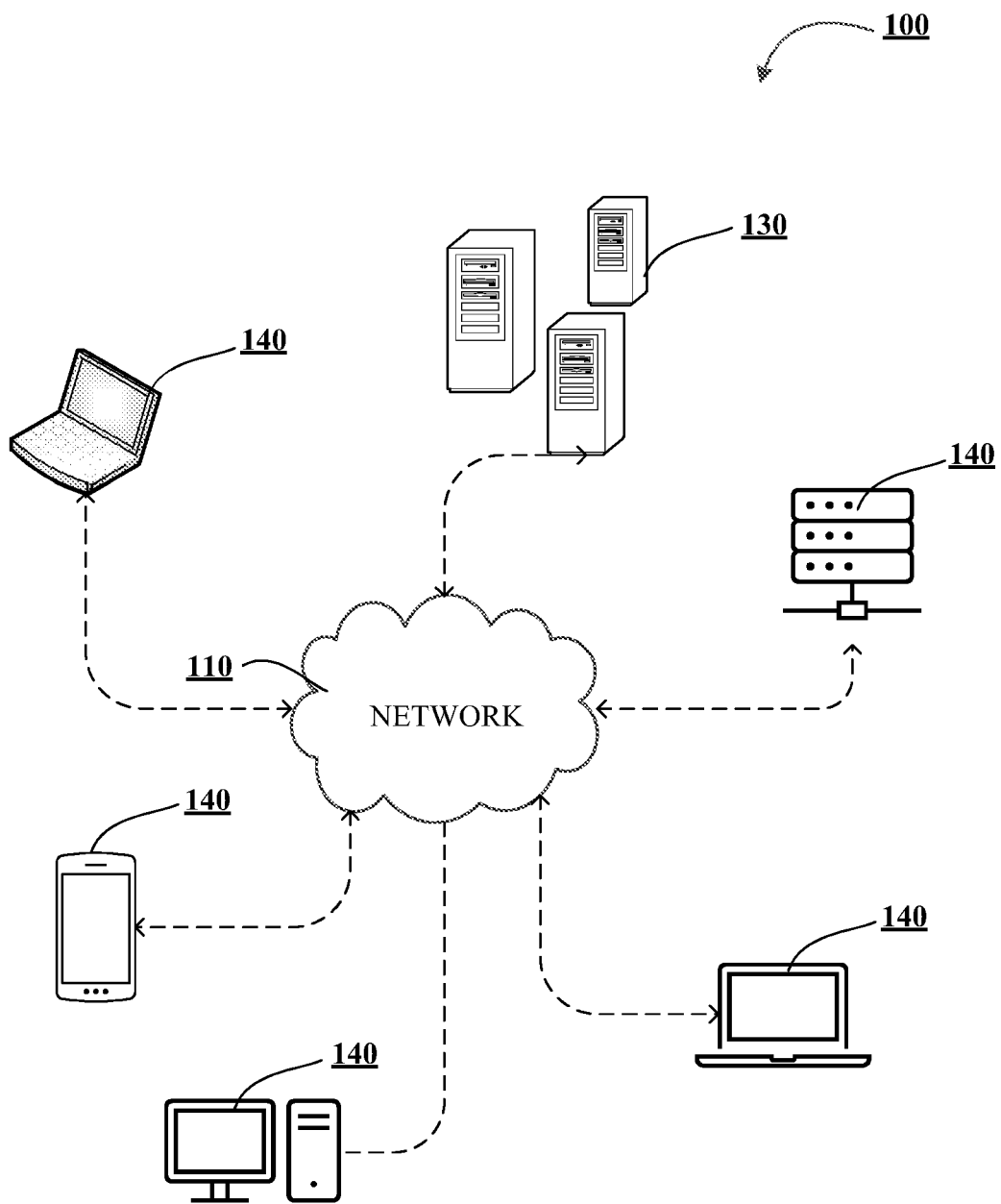
FIGS. 1A-1C illustrates technical components of an exemplary distributed computing environment for large scale data extraction and processing, in accordance with various embodiments of the present disclosure.

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure, and positioning (distal phalanges, intermediate phalanges, proximal phalanges, and the like)), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Data processing and extraction can be difficult to accomplish on a large scale without causing a strain on network and processing capabilities. User accounts may periodically be transferred from one entity to another. As such, data relating to user accounts, such as account statements, may also need to be retrieved and delivered to the receiving entity. However, an entity database may comprise large numbers of files and therefore it can be difficult to target the specific account statements without causing unnecessary strain on the network and/or processing capabilities.

Various embodiments of the present disclosure allow for large scale data extraction and processing. A transmission request may include two or more accounts that are to be transferred from a first entity to a second entity. The accounts are divided into individual retrieval sets (e.g., first retrieval set, second retrieval set, etc.) based on the number of accounts, the time period to retrieve the data, the network capacity, and/or the like. In an example embodiment, each of the retrieval sets may be selected based on a shared characteristics of the user identifier (e.g., all accounts with the same last character of the user identifier may be in the same retrieval set). Account statements (e.g., images of the account statements) for each account of a given retrieval set are retrieved for a set time frame (e.g., one year worth of account statements may be retrieved). The retrieval process may be completed during a time period of low network usage (e.g., during low usage time period, such as overnight). Each of the retrieved account statements can then be consolidated into one or more files (e.g., a .ZIP file) to be transferred to the receiving entity.

Figure 1B:
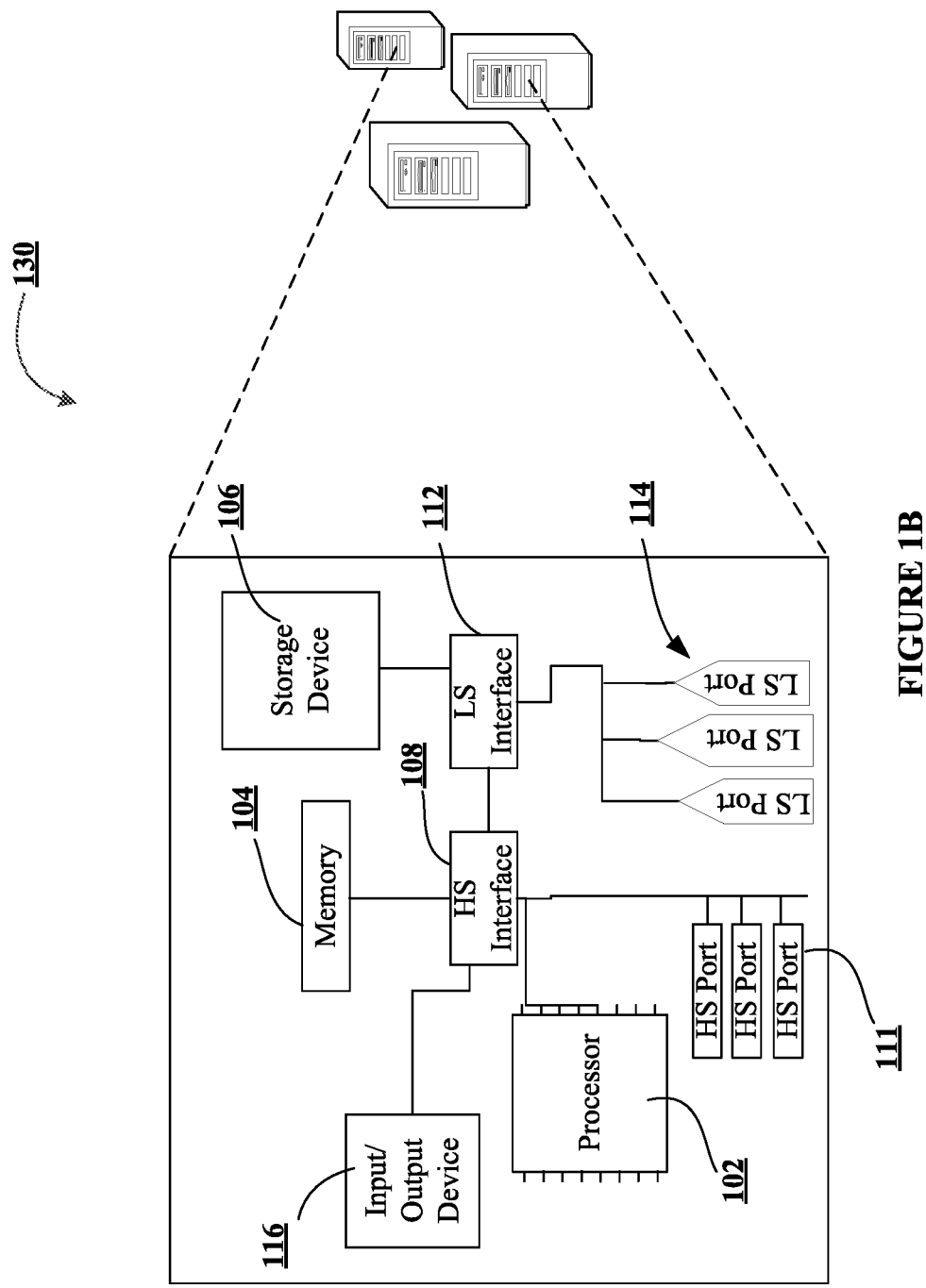
Figure 1C:
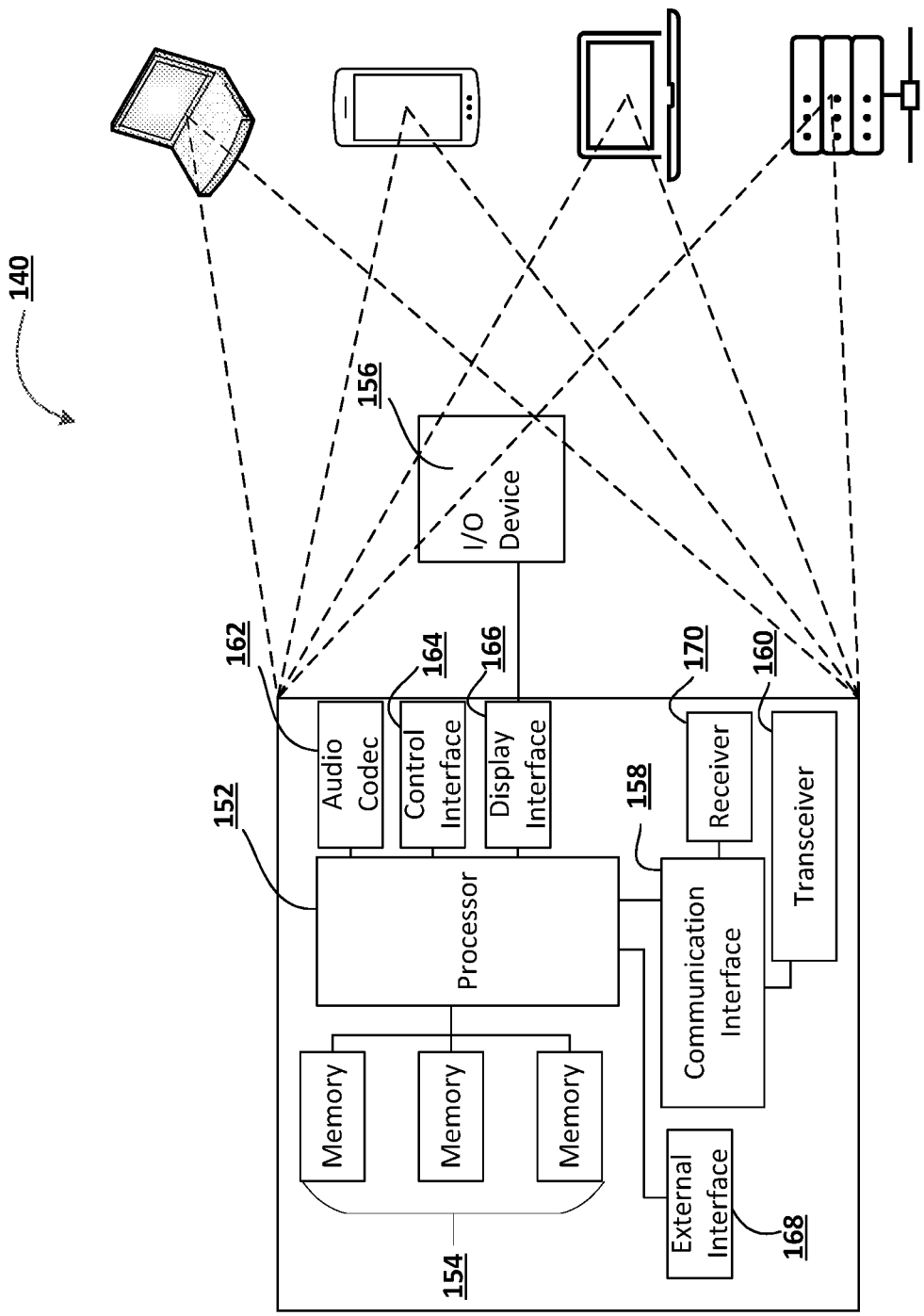

FIGS. 1A-1C illustrate technical components of an exemplary distributed computing environment for large scale data extraction and processing, in accordance with various embodiments of the disclosure. As shown in FIG. 1A, the distributed computing environment 100 contemplated herein may include a system 130 (e.g., a large scale data extraction device), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 110. Each of the components 102, 104, 106 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
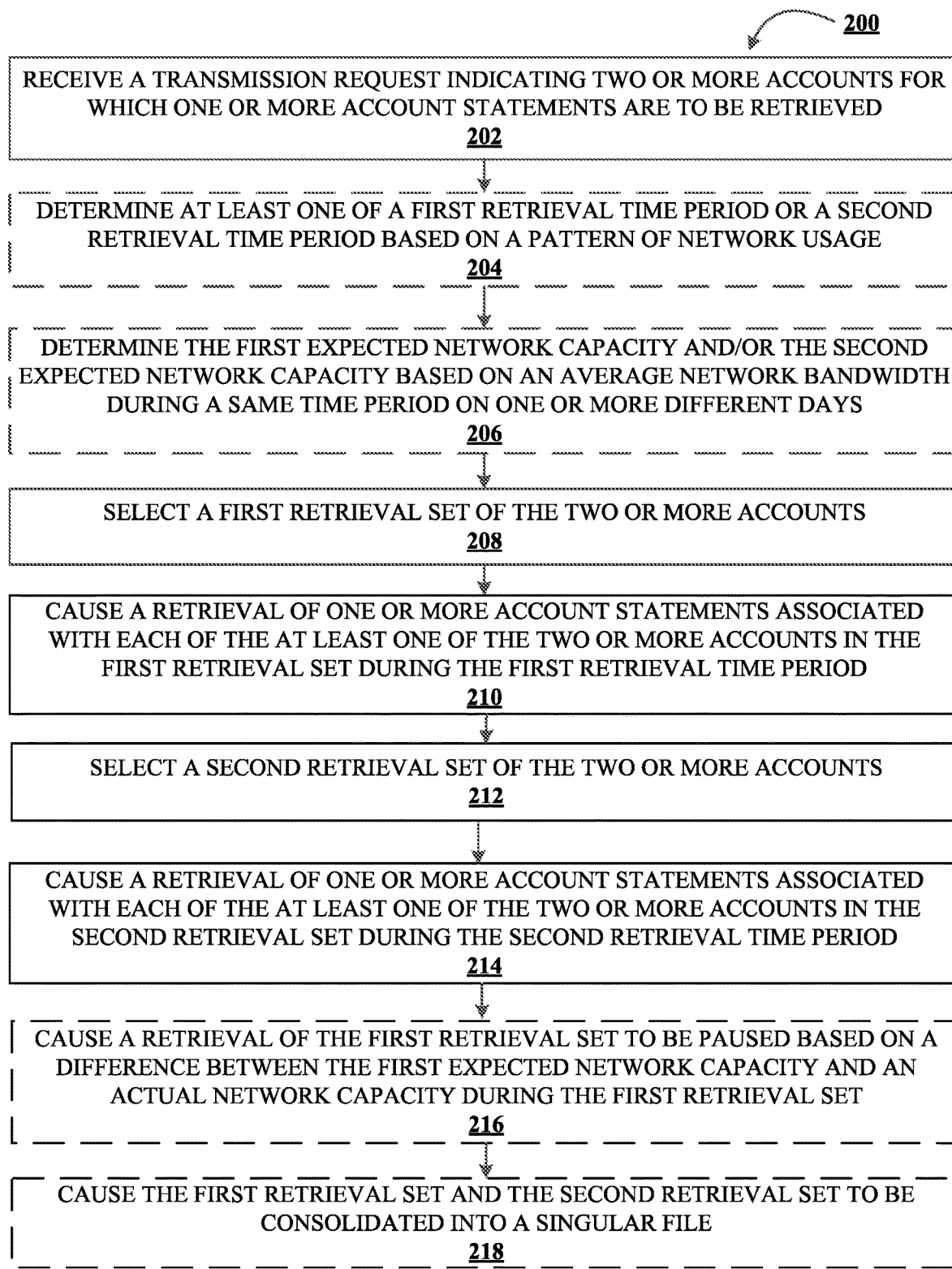
FIG. 2 illustrates a process flow for large scale data extraction and processing, in accordance with various embodiments of the present disclosure.

FIG. 2 is a flow chart 200 that illustrates an example method of large scale data extraction and processing. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein.

Referring now to Block 202 of FIG. 2, the method includes receiving a transmission request indicating two or more accounts for which one or more account statements are to be retrieved. In various embodiments, the two or more accounts may be indicated by an account identifier for each of the given accounts. Additionally or alternatively, other indicators may be provided to identify the accounts for which the account statements are to be retrieved. The account identifiers may correspond to a single account of a user (e.g., a user with multiple accounts may have multiple account identifiers). While various embodiments of the present disclosure discuss the retrieval of account statements, the operations may be used for various documents or other data files and as such, the account statements may correspond to any files that correspond to an account.

In various embodiments, the account identifiers may correspond to a user and not the specific account (e.g., an account identifier may correspond to a user that has multiple accounts). In such an embodiment, the transmission request may include the type of account in which the transmission request is directed. For example, the account identifier may identify a user and the transmission request may also indicate that the transmission request is directed to certain account types.

The transmission request may include additional information relating to the account statements to be retrieved. The transmission request may include a statement time frame. The statement time frame includes the dates in which the account statements are desired. The statement time frame may include a specific time frame (e.g., from January 2022 to June 2022 or the last X number of statements for each account). In some embodiments, the system is configured to locate and/or retrieve any statements within the statement time frame. In some instances, an account may have fewer or no account statements during a statement time frame. For example, the account may have been opened during the statement time frame and fewer account statements may have been issued. In such an embodiment, the system may indicate that fewer than expected or no account statements were available for the given account (e.g., the system may indicate that the database was searched, but no account statements were present).

Referring now to optional Block 204 of FIG. 2, the method includes determining at least one of a first retrieval time period or a second retrieval time period based on a pattern of network capacity. The network capacity may be based on the network strength, network bandwidth, and/or the like that effect the network speed during operation. The network may be monitored over one or more periods of time to determine the network capacity. The pattern of network capacity may include the network strength and network bandwidth at a given time of day over one or more days. The system may identify higher network capacity periods and lower network capacity periods. The higher network capacity period may be periods in which the network capacity is generally higher (e.g., higher bandwidth availability and/or higher network strength) and the lower network capacity may be periods in which the network capacity is generally lower (e.g., lower bandwidth availability and/or reduced network strength). In an example embodiment, a higher network capacity period may be a period in which the network capacity is higher than an average network capacity (e.g., over a period of time, an average network capacity can be determined). Various other metrics may be used to determine the higher network capacity periods, such as a minimum bandwidth availability, minimum network strength, etc.

In various embodiments, the first retrieval time period and/or the second retrieval time period may be selected during time periods in which the typical network capacity is high (e.g., a higher network capacity period). For example, the first retrieval time period and/or the second retrieval time period may be completed during the overnight period in which network usage is reduced.

Referring now to optional Block 206 of FIG. 2, the method includes determining the first expected network capacity and/or the second expected network capacity based on an average network bandwidth during a same time period on one or more different days. As discussed above in reference to Block 204 of FIG. 2 above, the network may be monitored over one or more periods of time to determine the network capacity (e.g., average network bandwidth, average network strength, etc.). As such, a given time period during a day may have an expected network capacity (e.g., the same or similar network capacity across multiple days). In some instances, certain days may have different network usage (e.g., weekdays may have less network capacity than weekends) and as such, each retrieval time period (e.g., the first retrieval time period, the second retrieval time period, etc.) may be selected for days with similar expected network capacity (e.g., during weekday nights).

Referring now to Block 208 of FIG. 2, the method includes selecting a first retrieval set of the two or more accounts. The first retrieval set may include at least one of the two or more accounts. The selection of the first retrieval set may be based on the first retrieval set size. The first retrieval set size of the first retrieval set may be based on the first expected network capacity during at least a portion of a first retrieval time period. The first retrieval set size may be selected based on the total number of accounts indicated by the transmission request, the amount of time to complete the processing of the transmission request, network capacity, and/or the like.

The first retrieval set may be determined based on one or more characteristics of the account identifier for each of the accounts. In various embodiments, the user identifier (e.g., an alphanumerical identifier with one or more characters) may be a randomly generated number and therefore may have a random distribution of alphanumerical values. As such, one or more characters of the user identifier can be used to generate approximately equal groupings. For example, in an instance in which a character of a user identifier is a numerical value from zero to nine, then approximately ten percent of the accounts in a sample size would have each distinct numerical value.

In various embodiments, the first retrieval set may include each of the user identifiers that share one or more of the same characters in the same locations in the user identifier (e.g., the same last character of the user identifier). As such, the first retrieval set size is based on the uniqueness of the shared characteristics (e.g., sharing one character in the same location would include more accounts than sharing multiple characters in the same location). As such, the use of unique user identifier characteristics can divide the total accounts into approximately the desired retrieval set size without requiring a complex and processor intensive selection process.

In various embodiments, a verification process may be completed to ensure that actual size of each retrieval set is in line with expected/desired retrieval set size. In various embodiments, the system may allow for a predetermined difference range between the actual retrieval set size and the desired/expected retrieval set size. In various embodiments, one or more actions may be completed in an instance in which the actual retrieval set is outside of the predetermined difference range. For example, the retrieval set may be adjusted to fit within the predetermined difference range (e.g., one retrieval set may be retrieved over a plurality of time periods in an instance in which the retrieval set is too large).

Referring now to Block 210 of FIG. 2, the method includes causing a retrieval of one or more account statements associated with each of the at least one of the two or more accounts in the first retrieval set during the first retrieval time period. The transmission request may indicate a statement time frame in which one or more account statements are desired.

The one or more account statements may be stored in one or more databases. The databases may be parsed for the accounts with the shared characteristic of the first retrieval set (e.g., the database may be individually parsed for documents relating to each account in the first retrieval set). Additionally, the individual records may be further filtered based on the date (e.g., statement time frame). As such, the system is configured to retrieve the desired account statements (e.g., an image of each account statement during a statement time frame) for each account within the first retrieval set. The retrieval of the account statements may be repeated for each account in the first retrieval set. Additionally or alternatively, information relating to the account statements (e.g., metadata) may be retrieved. For example, metadata on an account may be retrieved that indicates the number of account statements available during the statement time frame.

A notification of completion may be transmitted upon completion (e.g., allowing a user to monitor the process). Real-time monitoring may also be used (e.g., a status bar may be used to indicate the percentage of the total first retrieval set has been retrieved).

Referring now to Block 212 of FIG. 2, the method includes selecting a second retrieval set of the two or more accounts. Unless otherwise noted, the second retrieval set is selected in the same fashion as the first retrieval set discussed above. The second retrieval set includes at least one of the two of more account indicated by the transmission request. The second retrieval set includes one or more accounts that are distinct from the first retrieval set. The second retrieval set size of the second retrieval set may be based on a second expected network capacity during at least a portion of a second retrieval time period. The second retrieval set size may be the same as the first retrieval set size (e.g., the first retrieval set size may be used for each subsequent retrieval set size).

The second retrieval set may be determined based on one or more characteristics of the account identifier for each of the accounts. Like the first retrieval set above, one or more characters of the user identifier can be used to generate approximately equal groupings of the total accounts. For example, in an instance in which a character of a user identifier is a numerical value from zero to nine, then approximately ten percent of the accounts in a sample size would have each distinct numerical value.

In various embodiments, the second retrieval set may include each of the user identifiers that share one or more of the same characters in the same locations in the user identifier (e.g., the same last character of the user identifier). As such, the second retrieval set size is based on the uniqueness of the shared characteristics (e.g., sharing one character in the same location would include more accounts than sharing multiple characters in the same location). As such, the use of unique user identifier characteristics can divide the total accounts into approximately the desired retrieval set size without requiring a complex and processor intensive selection process. The first retrieval set and the second retrieval set may be based on the same one or more character locations of the account identifiers. For example, the first retrieval set may include account(s) that have account identifiers that end in 1 and the second retrieval set may include account(s) that have account identifiers that end in 2.

In various embodiments, a verification process may be completed to ensure that actual size of each retrieval set is in line with expected/desired retrieval set size. In various embodiments, the system may allow for a predetermined difference range between the actual retrieval set size and the desired/expected retrieval set size. In various embodiments, one or more actions may be completed in an instance in which the actual retrieval set is outside of the predetermined difference range. For example, the retrieval set may be adjusted to fit within the predetermined difference range (e.g., one retrieval set may be retrieved over a plurality of time periods in an instance in which the retrieval set is too large).

Referring now to Block 214 of FIG. 2, the method includes causing a retrieval of one or more account statements associated with each of the at least one of the two or more accounts in the second retrieval set during the second retrieval time period. Unless otherwise noted, the second retrieval set is retrieved in the same fashion as the first retrieval set discussed above. The transmission request may indicate a statement time frame in which one or more account statements are desired.

The one or more account statements may be stored in one or more databases. The databases may be parsed for the accounts with the shared characteristic of the second retrieval set (e.g., the database may be individually parsed for documents relating to each account in the second retrieval set). Additionally, the individual records may be further filtered based on the date (e.g., statement time frame). As such, the system is configured to retrieve the desired account statements (e.g., an image of each account statement during a statement time frame) for each account within the second retrieval set. The retrieval of the account statements may be repeated for each account in the second retrieval set. Additionally or alternatively, information relating to the account statements (e.g., metadata) may be retrieved. For example, metadata on an account may be retrieved that indicates the number of account statements available during the statement time frame.

A notification of completion may be transmitted upon completion (e.g., allowing a user to monitor the process). Real-time monitoring may also be used (e.g., a status bar may be used to indicate the percentage of the total second retrieval set has been retrieved).

In various embodiments, each of the retrieval sets (e.g., first retrieval set, second retrieval set, etc.) may be retrieved during approximately the same period of time on different days. For example, the retrieval process for each may begin at 9 PM every night and operate until 6 AM (e.g., this time frame is merely illustrative of a time period in which the operations may be completed). In some embodiments, the retrieval of the second retrieval set may be completed over a plurality of time periods (e.g., not all of the account statements may be retrieved on a first day and the process will be continued on a second day until the account statements are retrieved).

In various embodiments, the system may divide the one or more accounts indicated by the transmission request into any different number of retrieval sets. As such, the first retrieval set and the second retrieval set are merely illustrative of the operations. For example, the system may include a third retrieval set, a fourth retrieval set, etc., with each additional retrieval set being retrieved in the same or similar fashion to the first retrieval set and/or the second retrieval set. The number of retrieval sets may be based on the network capacity during one or more retrieval time periods, the number of accounts indicated by the transmission request, the number of statements accorded to each account, and/or the like. As such, the number and size of retrieval sets may be variable across various data retrieval and processing operations.

Referring now to optional Block 216 of FIG. 2, the method includes causing a retrieval of the first retrieval set to be paused based on a difference between the first expected network capacity and an actual network capacity during the first retrieval set. The retrieval process for the first retrieval set, second retrieval set, and/or any additional retrieval sets may be paused during operations. The pausing of the retrieval process may be automated (e.g., in response to a change in network capacity) or manual (e.g., a user may pause the retrieval in order to perform testing or otherwise use network capacity). In some embodiments, the given retrieval process may be paused in an instance in which the actual network capacity is significantly less than the given expected network capacity. The term significant may be based on a predetermined percentage or value difference between the actual network capacity and the expected network capacity. For example, the system may undergo maintenance periodically during non-peak hours and can reduce the network capacity. In such an example, the system may pause the retrieval process until the actual network capacity is restored (e.g., within a range of the expected network capacity).

In various embodiments, the retrieval process of the first retrieval set, second retrieval set, and/or any additional retrieval sets may also be resumed after being paused. In various embodiments, the resumption of the retrieval process may be manual (e.g., a user may resume the retrieval process after the reasoning for the pause is resolved). Alternatively, the resumption of the retrieval process may be automated (e.g., the retrieval process may be resumed when the actual network capacity is approximately the same as the expected network capacity). In various embodiments, the system is configured to resume the retrieval process without losing any account statements previously retrieved. The resumption of the retrieval process may cause a change in the retrieval time period (e.g., the first retrieval time period, the second retrieval time period, etc.). For example, the retrieval process may be delayed for a day and as such, the given retrieval time period is moved a day.

Referring now to optional Block 218 of FIG. 2, the method includes causing the first retrieval set and the second retrieval set to be consolidated into a singular file. Each of the account statements retrieved during the processes discussed herein may be consolidated into one or more files. For example, the account statements may be consolidated into a singular file (e.g., a .ZIP file that includes each of the account statements). The consolidated file(s) may also include identifier information for each of the account statements. For example, each account statement may include one or more identifiers (e.g., user identifier, account holder name/information, etc.). In various embodiments, the retrieval sets may be consolidated into multiple files (e.g., multiple .ZIP files may be used to manage the file size for transfer). The one or more consolidated files can be transferred in various communication methods, such as managed file transfer (e.g., SFTP).

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for large scale data extraction and processing, the system comprising:
   at least one non-transitory storage device; and
   at least one processing device coupled to the at least one non-transitory storage device, wherein the at least one processing device is configured to:
   receive a transmission request, wherein the transmission request indicates two or more accounts for which one or more account statements are to be retrieved;
   select a first retrieval set of the two or more accounts, wherein a first retrieval set size of the first retrieval set is based on a first expected network capacity during at least a portion of a first retrieval time period, and wherein the first retrieval set comprises at least one of the two or more accounts;
   cause a retrieval of one or more account statements associated with each of the at least one of the two or more accounts in the first retrieval set during the first retrieval time period;
   select a second retrieval set of the two or more accounts, wherein a second retrieval set size of the second retrieval set is based on a second expected network capacity during at least a portion of a second retrieval time period, and wherein the second retrieval set comprises at least one of the two or more accounts; and
   cause a retrieval of one or more account statements associated with each of the at least one of the two or more accounts in the second retrieval set during the second retrieval time period.

2. The system of claim 1, wherein the at least one processing device is configured to cause a retrieval of the first retrieval set to be paused based on a difference between the first expected network capacity and an actual network capacity during the first retrieval set.

3. The system of claim 1, wherein the at least one processing device is configured to determine the first expected network capacity based on an average network bandwidth during a same time period on one or more different days.

4. The system of claim 1, wherein the first retrieval time period is during a same time period on a first day and the second retrieval time period is during the same time period on a second day.

5. The system of claim 1, wherein the at least one processing device is configured to determine at least one of the first retrieval time period or the second retrieval time period based on a pattern of network capacity.

6. The system of claim 1, wherein the one or more account statements associated with each of the at least one of the two or more accounts in the first retrieval set comprises one or more account statements during a statement time frame, wherein the transmission request indicates the statement time frame.

7. The system of claim 6, wherein the one or more account statements associated with each of the at least one of the two or more accounts in the second retrieval set comprises one or more account statements during the statement time frame.

8. A computer program product for large scale data extraction and processing, the computer program product comprising at least one non-transitory computer-readable medium having computer-readable program code portions embodied therein, the computer-readable program code portions comprising:
- an executable portion configured to receive a transmission request, wherein the transmission request indicates two or more accounts for which one or more account statements are to be retrieved;
- an executable portion configured to select a first retrieval set of the two or more accounts, wherein a first retrieval set size of the first retrieval set is based on a first expected network capacity during at least a portion of a first retrieval time period, and wherein the first retrieval set comprises at least one of the two or more accounts;
- an executable portion configured to cause a retrieval of one or more account statements associated with each of the at least one of the two or more accounts in the first retrieval set during the first retrieval time period;
- an executable portion configured to select a second retrieval set of the two or more accounts, wherein a second retrieval set size of the second retrieval set is based on a second expected network capacity during at least a portion of a second retrieval time period, and wherein the second retrieval set comprises at least one of the two or more accounts; and
- an executable portion configured to cause a retrieval of one or more account statements associated with each of the at least one of the two or more accounts in the second retrieval set during the second retrieval time period.

9. The computer program product of claim 8, wherein the computer program product further comprises an executable portion configured to cause a retrieval of the first retrieval set to be paused based on a difference between the first expected network capacity and an actual network capacity during the first retrieval set.

10. The computer program product of claim 8, wherein the computer program product further comprises an executable portion configured to determine the first expected network capacity based on an average network bandwidth during a same time period on one or more different days.

11. The computer program product of claim 8, wherein the first retrieval time period is during a same time period on a first day and the second retrieval time period is during the same time period on a second day.

12. The computer program product of claim 8, wherein the computer program product further comprises an executable portion configured to determine at least one of the first retrieval time period or the second retrieval time period based on a pattern of network capacity.

13. The computer program product of claim 8, wherein the one or more account statements associated with each of the at least one of the two or more accounts in the first retrieval set comprises one or more account statements during a statement time frame, wherein the transmission request indicates the statement time frame.

14. The computer program product of claim 13, wherein the one or more account statements associated with each of the at least one of the two or more accounts in the second retrieval set comprises one or more account statements during the statement time frame.

15. A computer-implemented method for large scale data extraction and processing, the method comprising:
- receiving a transmission request, wherein the transmission request indicates two or more accounts for which one or more account statements are to be retrieved;
- selecting a first retrieval set of the two or more accounts, wherein a first retrieval set size of the first retrieval set is based on a first expected network capacity during at least a portion of a first retrieval time period, and wherein the first retrieval set comprises at least one of the two or more accounts;
- causing a retrieval of one or more account statements associated with each of the at least one of the two or more accounts in the first retrieval set during the first retrieval time period;
- selecting a second retrieval set of the two or more accounts, wherein a second retrieval set size of the second retrieval set is based on a second expected network capacity during at least a portion of a second retrieval time period, and wherein the second retrieval set comprises at least one of the two or more accounts; and
- causing a retrieval of one or more account statements associated with each of the at least one of the two or more accounts in the second retrieval set during the second retrieval time period.

16. The method of claim 15, further comprising causing a retrieval of the first retrieval set to be paused based on a difference between the first expected network capacity and an actual network capacity during the first retrieval set.

17. The method of claim 15, further comprising determining the first expected network capacity based on an average network bandwidth during a same time period on one or more different days.

18. The method of claim 15, wherein the first retrieval time period is during a same time period on a first day and the second retrieval time period is during the same time period on a second day.

19. The method of claim 15, wherein the one or more account statements associated with each of the at least one of the two or more accounts in the first retrieval set comprises one or more account statements during a statement time frame, wherein the transmission request indicates the statement time frame.

20. The method of claim 19, wherein the one or more account statements associated with each of the at least one of the two or more accounts in the second retrieval set comprises one or more account statements during the statement time frame.

* * * * *